United States Patent [19]

Guerreri

[11] Patent Number: 5,375,008
[45] Date of Patent: Dec. 20, 1994

[54] SYSTEMS FOR DISTINGUISHING BETWEEN FRIENDLY GROUND TARGETS AND THOSE OF A FOE

[75] Inventor: Carl N. Guerreri, Manassas, Va.

[73] Assignee: Electronic Warfare Associates, Inc., Herndon, Va.

[21] Appl. No.: 731,647

[22] Filed: Jul. 17, 1991

[51] Int. Cl.$^5$ ............................................... G01S 13/78
[52] U.S. Cl. .................................... 359/169; 342/45
[58] Field of Search ................... 342/45; 359/169, 170

[56] References Cited

U.S. PATENT DOCUMENTS

| | | | |
|---|---|---|---|
| 4,143,835 | 3/1979 | Jennings et al. | 244/3.11 |
| 4,245,800 | 1/1981 | Henderson | 244/3.13 |
| 4,259,009 | 3/1981 | Jernigan | 356/1 |
| 4,333,008 | 6/1982 | Misek | 250/225 |
| 4,394,997 | 7/1983 | Mandal | 244/3.16 |
| 4,407,465 | 10/1983 | Meyerhoff | 244/3.16 |
| 4,516,743 | 5/1985 | Sweeney et al. | 244/3.13 |
| 4,600,305 | 7/1986 | Priddy | 356/152 |
| 4,709,875 | 12/1987 | Cremosnik et al. | 244/3.13 |
| 4,731,879 | 3/1988 | Sepp et al. | 455/604 |
| 4,763,361 | 8/1988 | Honeycutt et al. | 455/605 |
| 4,814,769 | 3/1989 | Robin et al. | 342/45 |
| 4,837,575 | 6/1989 | Conner, Jr. | 342/45 |
| 5,001,488 | 3/1991 | Joguet | 342/45 |

OTHER PUBLICATIONS

Sshrage, M., "War Project Shows Pentagon Procurement Can Be Fast, Flexible"; *Washington Post*, 14 Jun. 1991, p. D3.

*Primary Examiner*—Mark Hellner
*Attorney, Agent, or Firm*—Roland H. Shubert

[57] ABSTRACT

Systems are provided for distinguishing between friendly ground targets and those of a foe and for receiving passive communications from friendly ground targets by providing friendly ground targets with reflector means adapted to modulate or otherwise change the character of laser light striking the reflector surface. The target is illuminated with a laser beam and the reflected laser energy is examined to determine whether it differs in character from that normally reflected from a target. Modulation of the laser beam can be accomplished by changing the reflectivity of the reflector means according to a selected sequence or pattern.

11 Claims, 2 Drawing Sheets

SYSTEMS FOR DISTINGUISHING BETWEEN FRIENDLY GROUND TARGETS AND THOSE OF A FOE

BACKGROUND OF THE INVENTION

1. Field of the Invention

This invention relates to means and methods for discriminating between friendly ground targets and those belonging to a foe whereby the inadvertent attack on a friendly target can be avoided.

More specifically, this invention relates to means carried by friendly ground targets which interact with laser target designator beams to change the character of reflected laser energy and so provide means for distinguishing between friendly targets and those belonging to a foe.

2. Description of the Related Art

Laser target designators are in common use for military systems. In such systems, a laser beam is used to illuminate a target and so designate it for attack. The laser light striking the target is reflected in all directions. A guided missile, bomb or other projectile which is directed at the target carries an internal guidance system which detects the reflected laser light and causes the missile or bomb to home in on the source of the reflected radiation.

In one version of such a system, the target is illuminated by a laser designator at a location apart from that where the missile or bomb is launched toward the target. The laser target designator may, for example, be operated by a man on the ground or in a ground vehicle or may be operated by the crew of an aircraft. A missile may be launched toward the designated target from another ground location or a missile or bomb may be launched from another attack platform such as from a second aircraft. Examples of such systems are shown by U.S. Pat. Nos. 4,143,835 and 4,259,009. In another version, the laser designator and the missile or bomb launch means are carried on the same platform; typically a helicopter or airplane.

In either case, it is the responsibility of the operator of the laser designator means to positively identify the illuminated target as belonging to the enemy. Were a friendly target to be designated by laser illumination, then a missile or a bomb launched toward the designated target would home in on that target as if it belonged to the enemy. The possibility for mistake in target identification is always present especially during nighttime and in other situations where visibility is limited.

Mistakes in target identification have occurred and, during the recent Operation Desert Storm, have resulted in casualties from friendly fire. It has been reported that, to avoid further targeting mistakes, identification devices comprising infrared beacons for attachment to ground vehicles were deployed during that operation. The beacons used battery powered infrared diodes blinking in a preset sequence which was visible to pilots and other observers using night vision devices. Such a solution was practical under the circumstances of that conflict in which absolute air superiority was quickly established and thereafter maintained. However, in other circumstances where enemy air power remained a threat, those same beacons would serve to give away vehicle locations and to mark targets for the enemy.

There remains an unfulfilled need for means to distinguish between targets which belong to friendly forces and those of the enemy upon designation of a potential target through laser illumination.

SUMMARY OF THE INVENTION

A system is provided for identifying friendly vehicles or other ground targets when those targets are illuminated by a laser designator to thereby avoid their inadvertent attack by projectiles homing on reflected laser radiation. The system includes a reflector carried by the vehicle and adapted to modulate or to otherwise change the character of laser energy striking the reflector and to reflect back energy of a changed character to a projectile launch vehicle which may be a helicopter, fixed wing aircraft, or ground platform. The launch vehicle is equipped with a receiver and processor which detects the reflected laser energy and determines whether the reflected radiation differs from that projected from the laser designator thus determining whether the lased target is friendly or belongs to a foe. In another embodiment of this invention, a system is provided for the laser interrogation of a target to determine whether it is friend or foe. In this embodiment, a laser is provided in combination with a receiver and processor to cast a laser beam upon a target and to receive back a reflection from which the target may be identified and information about the target may be obtained.

Hence, it is an object of this invention to provide a system for identifying friendly ground targets when illuminated by a laser designator to thereby avoid an inadvertent attack on those targets.

Another object of this invention is to provide a system which reflects back radiation of changed character when struck by a laser beam thus providing a means for discriminating between friendly targets and those of a foe when the system is illuminated by a laser designator.

An additional object of this invention is to provide a laser interrogation system to determine the identity of a target and to obtain information therefrom.

Yet another object of this invention is to provide a reflector arranged for mounting on a ground vehicle and adapted to reflect back radiation of a changed character when struck by a laser beam.

Those and other objects of this invention will be apparent from the following detailed description of the invention.

DESCRIPTION OF THE DRAWING

Specific embodiments of the invention are illustrated in the drawing in which.

DETAILED DESCRIPTION OF THE INVENTION

Figure 1:
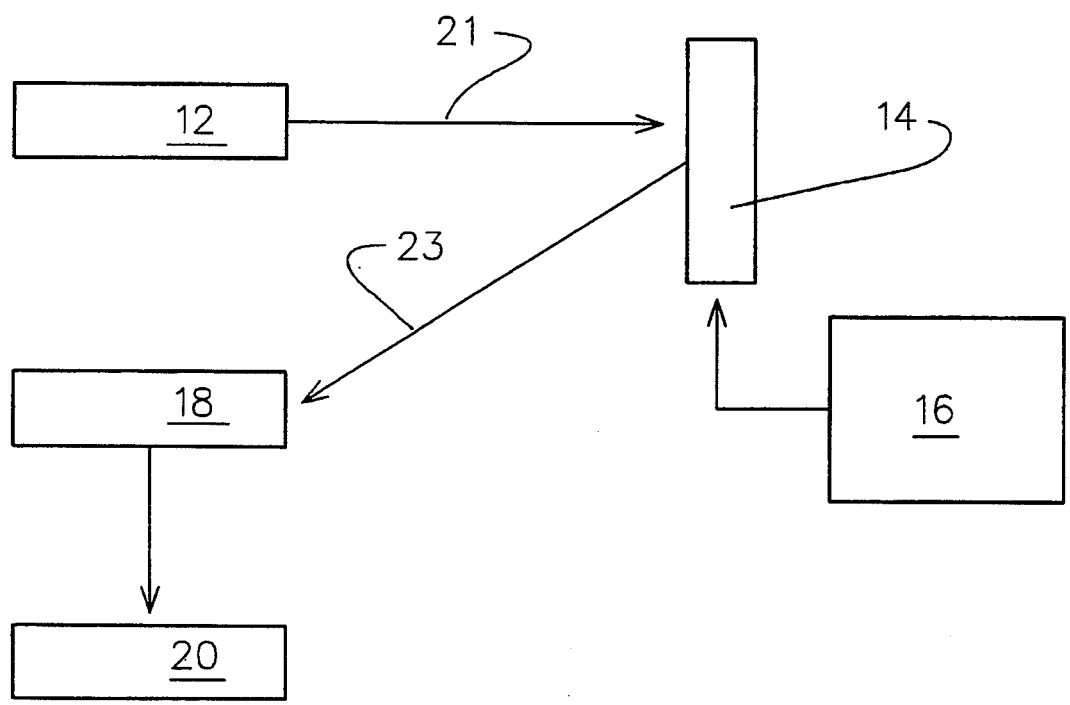
FIG. 1 is a block diagram of the system of this invention.

In describing the invention, reference is first made to FIG. 1 which sets out in block diagram form the necessary components making up the inventive system. Those components comprise a laser target designator 12 which projects a laser beam 21 to track and to designate potential targets. Laser designator 12 may be man-portable or may be mounted on a ground support vehicle or may be carried by an aircraft as the tactical situation warrants. There is provided reflector means 14 which are arranged for mounting at an appropriate location on friendly ground targets, principally vehicles such as trucks, armored personnel carriers and tanks. Reflector means 14 includes a surface which can be modulated in a manner so as to change the character of laser light reflected from its surface in some predetermined manner. That may include, for example, the imposition of a second wave form onto the laser beam and varying the amplitude, frequency, or phase of that wave form.

Modulation of the laser beam may be accomplished by means of a reflector modulating means 16 which generates a signal that is impressed upon a reflective surface of means 14 to change the character of laser energy reflected therefrom as, for example, by amplitude modulation in a pre-set pattern. That modulation may be accomplished in known manner by electronically changing the reflectivity of the reflecting surface in a pre-set or coded pattern as by the imposition of a electrical field thereon. Techniques for changing the reflectivity of a reflector surface are in commercial application for such uses as adjusting the image brightness of a vehicle rear view mirror in response to the intensity of incident light. The pattern imposed upon the reflector might be, for example, a particular wave form at a particular frequency such as a square wave pattern at a frequency of 1000 Hz.

Modulated laser energy reflected from the surface of reflector means 14 is received by a radiation detector and demodulator means 18. The signal and other electronic information produced by the detector and demodulator means is then sent to a signal processing and analysis means 20 which decodes and interprets any information impressed upon the reflected laser energy by reflector modulating means 16. Means 8 and 20 would normally be located in association with a projectile launch means such as a ground-to-ground missile launcher or would be carried by an airborne attack platform. However, in another embodiment of this invention described in connection with FIG. 3, means 18 and 20 would preferably be located in association with the laser.

The information produced by signal processing and analysis means 20 may be as basic as to determine whether or not the laser energy received by means 20 differs in character from that of the laser beam projected upon the target by laser target designator 12. If the reflected laser energy differs in character from that directed upon the target by laser designator 12, then the target being illuminated belongs to a friendly force. If, on the other hand, the reflected laser energy is unchanged in character from that striking the target from designator 12, then the target belongs to a foe.

While the basic version of the inventive system described above is sufficient to provide a positive means for discriminating between targets belonging to friend and foe, it is preferred that reflector modulating means 16 be programmable so as to allow the character of the reflected laser energy 23 to be changed at will. Providing a modulating means 16 with such capabilities allows for the reflected laser energy to carry additional information as, for example, the identification of the target by unit, or its condition or needs. Further, programmable modulating means 16 allows for a recognition code to be changed periodically or as needed to circumvent enemy countermeasures which might include the use of captured reflectors and modulating means.

Figure 2:
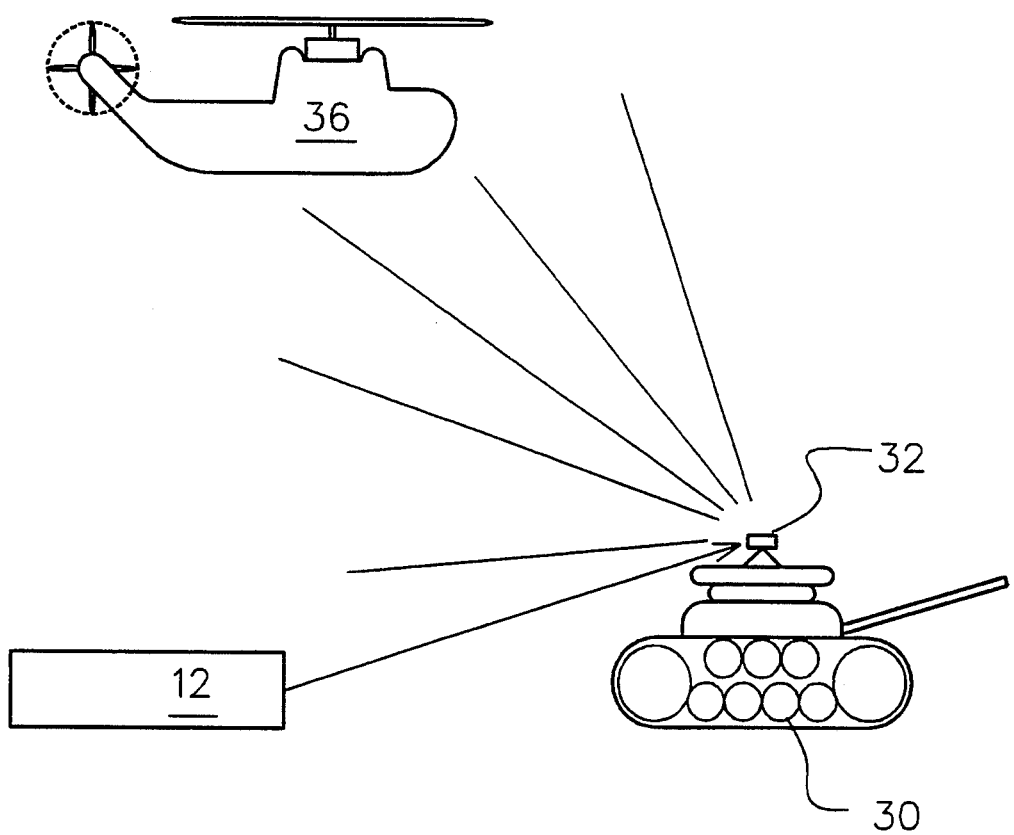
FIG. 2 is a diagrammatic illustration of the deployment of the system in accordance with one embodiment of the subject invention.

Turning now to FIG. 2, there is shown in diagrammatic fashion the deployment of a system in accordance with this invention. Laser target designator 12 is directed to illuminate a target which, in this instance, is a tank 30. Tank 30 is equipped with one or more reflectors 32 mounted at a location to efficiently intercept and reflect laser radiation directed toward the tank. Ordinarily, it will be appropriate to mount such a reflector at the top of the target vehicle as is shown in the drawing so that it may receive downwardly directed radiation, as from an aircraft, as well as laser radiation from ground based sources.

Reflector 32 may be of a generally curved or hemispherical configuration or it may be constructed in the shape of a conventional corner reflector or combinations of those different configurations. A hemispherical or other curved shape reflects back laser energy over a wide directional arc which is advantageous in those systems in which the laser designator is at a separate location from that of the radiation detector. A corner reflector, on the other hand, tends to reflect radiation directly back toward its source. Several corner reflectors may be grouped or ganged to provide multidirectional reflecting capability or may be combined with curved surface reflectors to provide that same capability. Ordinarily a single reflector, if properly positioned on a ground vehicle, is sufficient for identification purposes but multiple reflectors may be mounted on a single vehicle or other ground target.

A portion of the laser energy from the reflector 32 carried on tank 30 is directed to a radiation detector and signal analysis means, generally equivalent to elements 18 and 20 of FIG. 1, which is carried on board helicopter 36. In this case, helicopter 36 is taken to belong to friendly forces as does tank 30. Information furnished the helicopter crew by the signal analysis means determines that the laser energy directed toward the helicopter by the reflector 32 has been changed in character from that emitted by laser designator 12. That change in character may be, for example, an amplitude modulation of the reflected laser energy in a non-random fashion. The fact that there has been a change in character of the reflected radiation indicates to the helicopter crew that tank 30 belongs to friendly forces and therefore is not to be attacked or if under attack, the attack is to be broken off. The same result is obtained if laser designator 12 is carried by the helicopter along with the radiation detector and signal analysis means.

Figure 3:
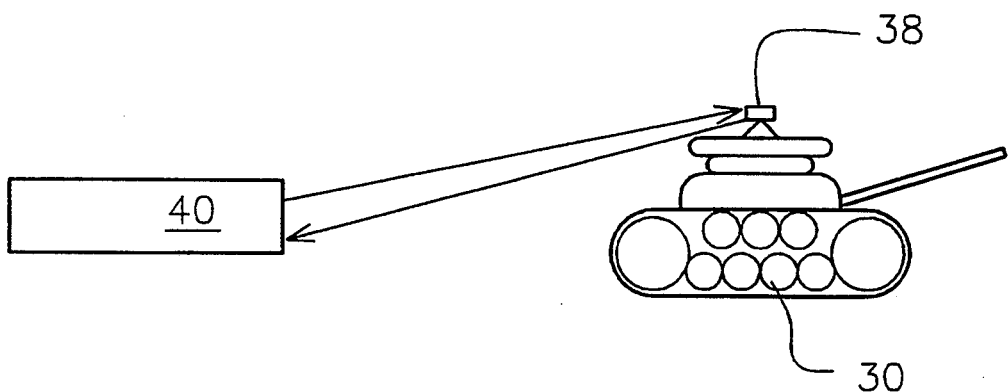
FIG. 3 is a diagrammatic illustration of the deployment of the system in an interrogation - passive communication mode.

Turning now to FIG. 3, there is illustrated another embodiment of the invention in which the system is used in a laser interrogation and passive communication mode. In this embodiment, there is provided unit 40 which includes a laser capable of directing a laser beam upon a target, a radiation and demodulator means, and a signal processing and analysis means equivalent in function to means 12, 18 and 20 of FIG. 1. Unit 40 projects a laser beam 43 upon tank 30 which has mounted thereon reflector means 38. In this mode of operation, it is desirable that reflector 38 contain elements of the corner reflector type so as to reflect a beam of laser energy 45 directly back to unit 40. Reflector 38 could, of course, be the same as reflector 32 of FIG. 2 were that reflector to include corner reflector elements. Modulation means controlled by the crew of tank 30 may be used to impress one or many coded signals upon reflector 38 by changing the character of laser light reflected therefrom. For example, in addition to the friend or foe identification signal, additional signals indicating the condition of the tank or its crew may be impressed upon reflector 38 for passive communication to unit 40 when queried by the laser beam. Such additional signals may indicate the ammunition or fuel supply available to the vehicle, the condition of its crew, whether there are wounded on board, and similar kinds of information. In form such additional signals may be patterned at different wave lengths, some signals being in the form of square waves and others being sine waves, for example, and at different frequencies, 1000, 1300 and 1700 Hz, for example.

In addition to the means and methods of operation taught above, it will be clear to those skilled in the art that minor variations and modifications can be made to the above described invention without departing from the basic principles and teachings thereof.

I claim:

1. Means to distinguish between friendly ground targets and those belonging to a foe comprising:
    means to illuminate said target with a beam of laser energy;
    reflector means carried by said friendly ground targets, said reflector means having a surface adapted to reflect energy back toward its source;
    modulating means acting on the reflective surface of said reflector to impress a signal upon said reflective surface in one or more pre-set, coded patterns, said signal causing a change in the reflectivity of said surface and thereby causing said surface to change the character of laser energy reflected therefrom, said modulating means operating independently of said illuminating beam of laser energy; and
    means to differentiate between laser energy normally reflected from a target and that laser energy of changed character reflected back from said reflector means.

2. The means of claim 1 wherein said signal is created by an electrical field which interacts with said reflective surface.

3. The means of claim 2 wherein said friendly target is a ground vehicle; wherein said pre-set, coded patterns can be changed at will; and wherein said patterns provides information about said target.

4. The means of claim 3 wherein said coded patterns comprise different designated wave forms at different designated frequencies.

5. The means of claim 1 wherein said differentiating means comprise means for detecting laser energy and means to analyze the character of said laser energy to determine whether it has been reflected from said reflector means.

6. In a weapons system wherein a ground target is designated for attack by illuminating the target with a laser beam and wherein a projectile having guidance means adapted to detect laser energy and to home onto the source of that laser energy is launched toward said laser beam illuminated target, the improvement comprising:
    reflector means carried by ground targets of friendly forces, said reflector means having a surface adapted to reflect back laser energy striking the reflector;
    modulating means acting on the surface of said reflector to impress a signal in a pre-set coded pattern thereon, said signal causing a change in the reflectivity of said surface and thereby causing said surface to change the character of light reflected therefrom, said modulating means controlled by said ground targets independently of said illuminating laser energy; and
    sensor means independent of said ground targets adapted to detect laser energy normally reflected by said target and that laser energy modulated by said reflector, whereby friendly targets can be identified to the guidance means of said projectile to thereby avoid an inadvertent attack on said friendly targets.

7. The system of claim 6 wherein said ground target is a vehicle and wherein said reflector means are mounted at an upper part of said vehicle.

8. The system of claim 6 wherein said signal comprises an electrical field which interacts with said reflective surface.

9. The system of claim 6 wherein said coded pattern comprises a designated wave form at a designated frequency.

10. The system of claim 6 including means for changing said coded pattern.

11. In a method for distinguishing between ground targets belong to friendly forces and those belonging to a foe, the improvement comprising:
    illuminating said target with a beam of laser light;
    providing reflector means to be carried by ground targets belonging to friendly forces, said reflector means having a surface adapted to reflect energy back toward its source;
    modulating reflected laser energy to impose one or more coded patterns thereon by causing changes in the reflectivity laser light of said reflector surface, said coded patterns conveying information about the illuminated target, said changes in reflectivity being independent of said illuminating bean of laser light; and
    sensing said reflected laser energy and analyzing a signal produced by said sensing to determine whether or not said reflected energy had been modulated by said reflector means to thereby determine whether the target illuminated by said laser beam belongs to a friend or a foe.

* * * * *